United States Patent
Takamori

(10) Patent No.: US 8,699,919 B2
(45) Date of Patent: Apr. 15, 2014

(54) IMAGE FORMING APPARATUS AND OPENING/CLOSING DEVICE

(75) Inventor: Yuichi Takamori, Akishima (JP)

(73) Assignee: Fuji Xerox Co., Ltd., Tokyo (JP)

( * ) Notice: Subject to any disclaimer, the term of this patent is extended or adjusted under 35 U.S.C. 154(b) by 472 days.

(21) Appl. No.: 13/037,910

(22) Filed: Mar. 1, 2011

(65) Prior Publication Data

US 2012/0080987 A1  Apr. 5, 2012

(30) Foreign Application Priority Data

Sep. 30, 2010 (JP) ................. 2010-220359

(51) Int. Cl.
*E05F 5/02* (2006.01)
*G03G 21/16* (2006.01)
*H04N 1/10* (2006.01)

(52) U.S. Cl.
CPC .............. *G03G 21/16* (2013.01); *H04N 1/1017* (2013.01); *E05F 5/02* (2013.01)
USPC .......................................... 399/125; 312/327

(58) Field of Classification Search
CPC ...................................................... G03G 21/16
USPC .............. 220/810–812; 312/22, 327; 399/125
See application file for complete search history.

(56) References Cited

U.S. PATENT DOCUMENTS

| | | | | |
|---|---|---|---|---|
| 7,433,629 | B2 * | 10/2008 | Tomatsu | 399/125 |
| 7,804,628 | B2 * | 9/2010 | Hashimoto et al. | 358/494 |
| 7,826,769 | B2 | 11/2010 | Yamaguchi | |
| 7,991,325 | B2 | 8/2011 | Yamaguchi | |
| 2006/0088336 | A1 | 4/2006 | Hirose et al. | |
| 2008/0131164 | A1 | 6/2008 | Ohta et al. | |
| 2008/0175620 | A1 | 7/2008 | Ohta et al. | |

FOREIGN PATENT DOCUMENTS

| | | | | |
|---|---|---|---|---|
| JP | 2006-080864 | | 3/2006 | |
| JP | 2006-119474 | * | 5/2006 | ............. G03G 15/00 |
| JP | 2008-139763 | | 6/2008 | |
| JP | 2009-80394 | A | 4/2009 | |
| JP | 2009-134227 | | 6/2009 | |
| JP | 2009-204709 | A | 9/2009 | |
| JP | 2010-008967 | A | 1/2010 | |

OTHER PUBLICATIONS

Japanese Office Action issued in Japanese Application No. 2010-220359 dated Sep. 13, 2013.

* cited by examiner

*Primary Examiner* — Clayton E Laballe
*Assistant Examiner* — Kevin Butler
(74) *Attorney, Agent, or Firm* — Sughrue Mion, PLLC

(57) ABSTRACT

An image forming apparatus includes: an image forming apparatus main body; a supported body rotatably supported with the image forming apparatus main body; and a buffer device that shock-absorbs a shock due to a rotational operation of the supported body, the buffer device having: a guide member provided in the supported body; and a buffer device main body having a guided member provided in the image forming apparatus main body and guided with the guide member and a pressing member that presses the guided member, and in assembly before attachment of the buffer device main body to the image forming apparatus main body, in a state where the supported body is opened from the image forming apparatus main body, when the guided member is attached to the guide member, a movement prevention part provided in the guided member or the guide member preventing movement of the guided member in a direction away from the guide member.

4 Claims, 25 Drawing Sheets

IMAGE FORMING APPARATUS AND OPENING/CLOSING DEVICE

CROSS-REFERENCE TO RELATED APPLICATION

This application is based on and claims priority under 35 USC 119 from Japanese Patent Application No. 2010-220359 filed Sep. 30, 2010.

BACKGROUND

Technical Field

The present invention relates to an image forming apparatus and an opening/closing device.

SUMMARY

According to an aspect of the present invention, there is provided an image forming apparatus including: an image forming apparatus main body; a supported body rotatably supported with the image forming apparatus main body; and a buffer device that shock-absorbs a shock due to a rotational operation of the supported body, the buffer device having: a guide member provided in the supported body; and a buffer device main body having a guided member provided in the image forming apparatus main body and guided with the guide member and a pressing member that presses the guided member, and in assembly before attachment of the buffer device main body to the image forming apparatus main body, in a state where the supported body is opened from the image forming apparatus main body, when the guided member is attached to the guide member, a movement prevention part provided in the guided member or the guide member preventing movement of the guided member in a direction away from the guide member.

BRIEF DESCRIPTION OF THE DRAWINGS

Exemplary embodiments of the present invention will be described in detail based on the following figures, wherein.

DETAILED DESCRIPTION

Next, exemplary embodiments of the present invention will be described based on the drawings.

Figure 1:
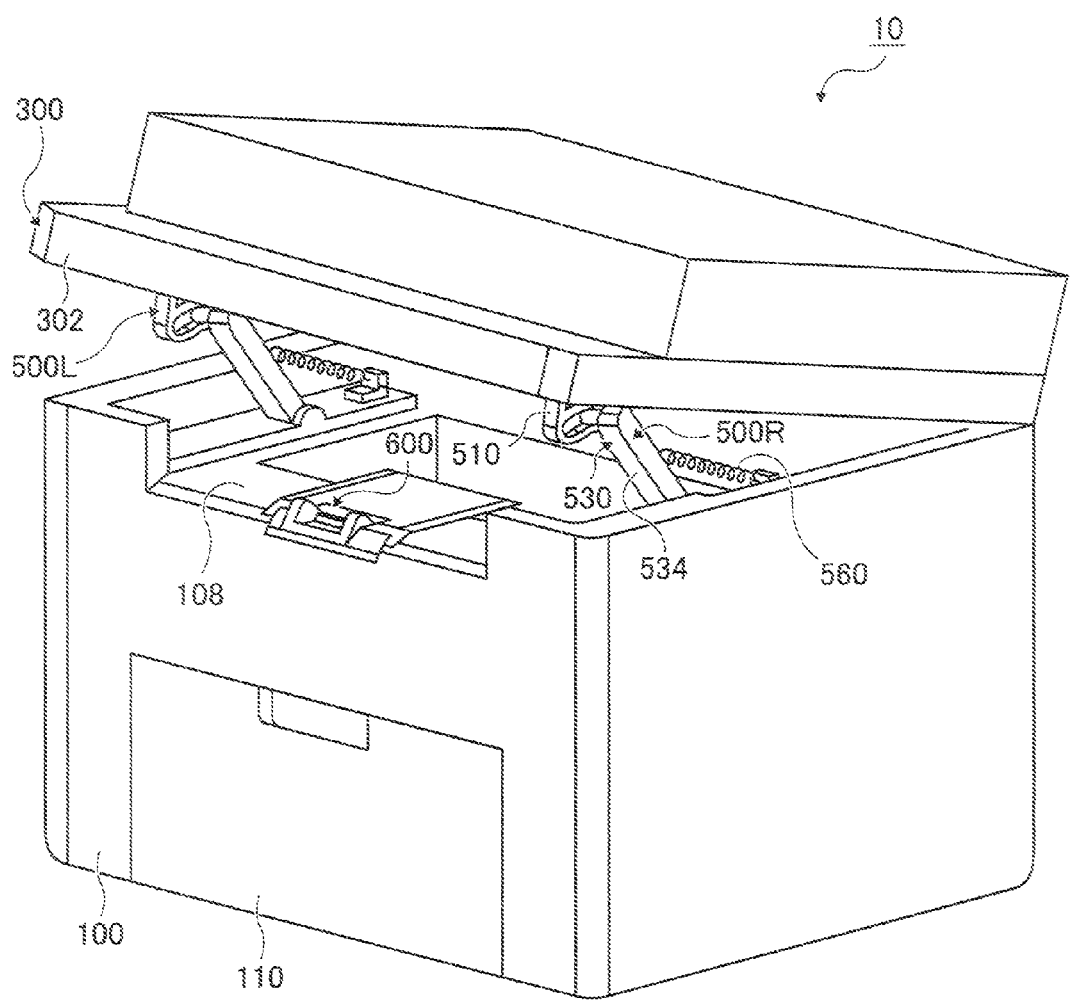
FIG. 1 is a perspective view of an image forming apparatus according to a first exemplary embodiment of the present invention.
Figure 2:
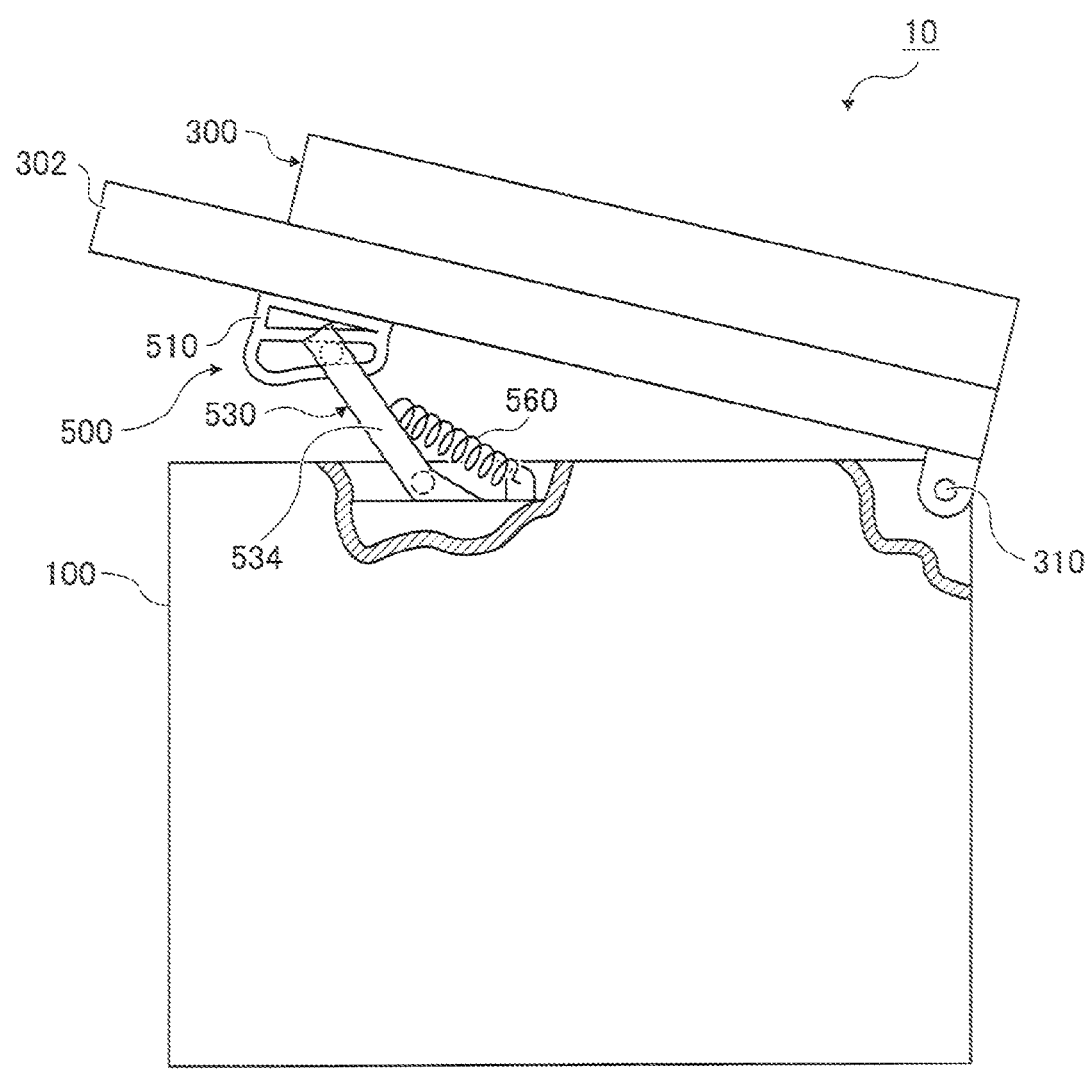
FIG. 2 is a partially cut-away diagram from the right side surface side of the image forming apparatus in FIG. 1.
Figure 3:
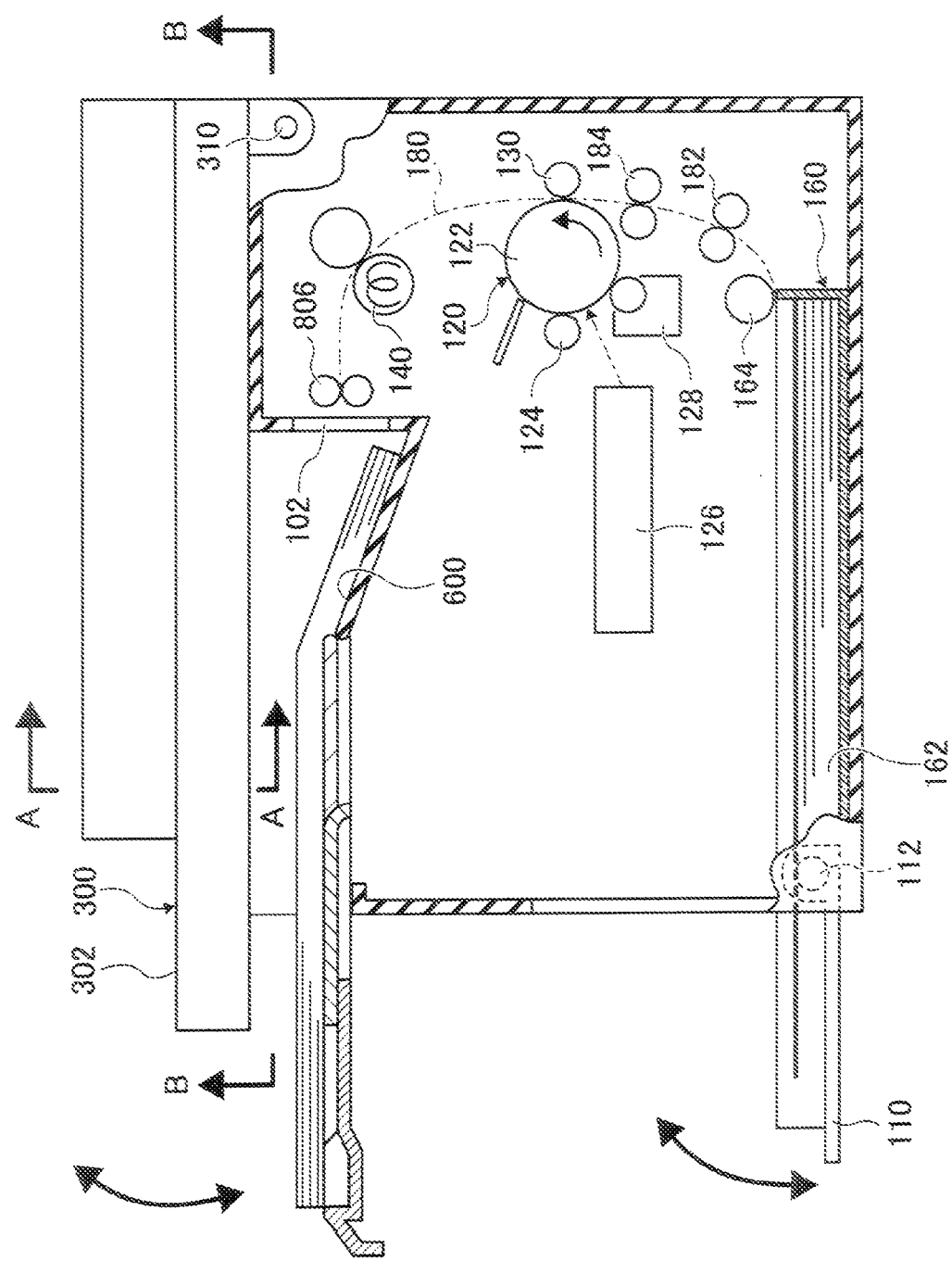
FIG. 3 is a cross-sectional view from the right side surface side of the image forming apparatus in FIG. 1.

FIGS. 1 to 3 show an image forming apparatus 10 according to a first exemplary embodiment of the present invention.

As shown in FIGS. 1 to 3, the image forming apparatus 10 has an image forming apparatus main body 100 used as a first structure, a document reading device 300 used as a second structure and as a supported body, and buffer devices 500R and 500L.

A surface 108 on the upper side of an image forming apparatus main body 100 is used as a part of a discharge part 600 where a sheet which is used as a recording medium and on which an image is formed is discharged. Further, the image forming apparatus main body 100 is provided with a sheet supply opening/closing member 110 in its front surface. The sheet supply opening/closing member 110 is attached openably/closably to the image forming apparatus main body 100 using a hinge 112. FIG. 1 shows a state where the sheet supply opening/closing member 110 is closed with respect to the image forming apparatus main body 100. FIG. 3 shows a state where the sheet supply opening/closing member 110 is opened with respect to the image forming apparatus main body 100. Further, the image forming apparatus main body 100 has a discharge hole 102 used for discharge of a sheet on which an image has been formed.

An image forming unit 120 and a sheet supply device 160 are attached in the image forming apparatus main body 100. Further, a conveyance passage 180 is formed in the image forming apparatus main body 100. The image forming unit 120 has a photoreceptor drum 122 used as an image holder, a charging device 124 to charge the surface of the photoreceptor drum 122, a latent image forming device 126 to form a latent image on the surface of the photoreceptor drum 122 by emitting light on the surface of the photoreceptor drum 122 charged with the charging device 124, a developing device 128 to develop the latent image formed with the latent image forming device 126 on the surface of the photoreceptor drum 122 using developer, a transfer device 130 to transfer, to a sheet, the developer image formed by developing with the developing device 128 on the surface of the photoreceptor drum 122, and a fixing device 140 to fix, to the sheet, the developer image transferred with the transfer device 130 onto the sheet.

The sheet supply device 160 has e.g. one sheet container 162 to hold sheets in a stacked state and a feed roller 164 to feed a sheet in the sheet container 162. To store sheets in a predetermined or greater size in the sheet container 162, in a state where the sheet supply opening/closing member 110 is opened, when such sheet is set, the rear end side of the sheet is protruded from the image forming apparatus main body 100, and the protruded part of the sheet is supported with the sheet supply opening/closing member 110 from the lower side in a gravitational direction.

The conveyance passage 180 is used for conveyance of the sheet from the sheet supply device 160 toward the transfer device 130, further toward the discharge part 600. The above-described feed roller 164, a conveyance roller 182, a registration roller 184, the above-described transfer device 130, the above-described fixing device 140, and a discharge roller 186 are provided sequentially from the upstream side in a sheet conveyance direction, along the conveyance passage 180.

The conveyance roller 182 conveys the sheet toward the registration roller 184. The registration roller 184 temporarily stops movement of the end of the sheet conveyed toward the transfer device 130, and restarts the movement of the end of the sheet toward the transfer device 130 in accordance with the timing of arrival of the developer image formed on the photoreceptor drum 122 at the position of the transfer device 130. The discharge roller 186 conveys the sheet on which the developer image is fixed with the fixing device 140 toward the discharge part 600.

The document reading device 300 having a document reading apparatus main body 302 is rotatably supported using a hinge 310 with the image forming apparatus main body 100. Further, the document reading device 300 is movable and openable/closable between a position opened with respect to the image forming apparatus main body 100 shown in FIGS. 1 and 2 and a position closed with respect to the image forming apparatus main body 100 shown in FIG. 3.

The buffer devices 500R and 500L are respectively used as a buffer device to shock-absorb a shock due to rotational operation of the document reading device 300. The buffer device 500R is provided on the right side in the image forming apparatus 10, and the buffer device 500L is provided on the left side in the image forming apparatus main body 100. Since the buffer device 500R and the buffer device 500L have the same structure, the buffer device 500R will be described hereinbelow, and the explanation of the buffer device 500L will be omitted. Further, hereinbelow, the buffer device 500R will be referred to as a buffer device 500 unless the buffer device 500R is particularly distinguished from the buffer device 500L.

The buffer device 500 has a guide member 510 used as a guide provided on the document reading device 300 and a buffer device main body 530. The buffer device main body 530 has an arm member 534 provided on the image forming apparatus main body 100 and used as a guided member guided with the guide member 510, and a coil spring 560 used as a pressing member to press the arm member 534.

Figure 4:
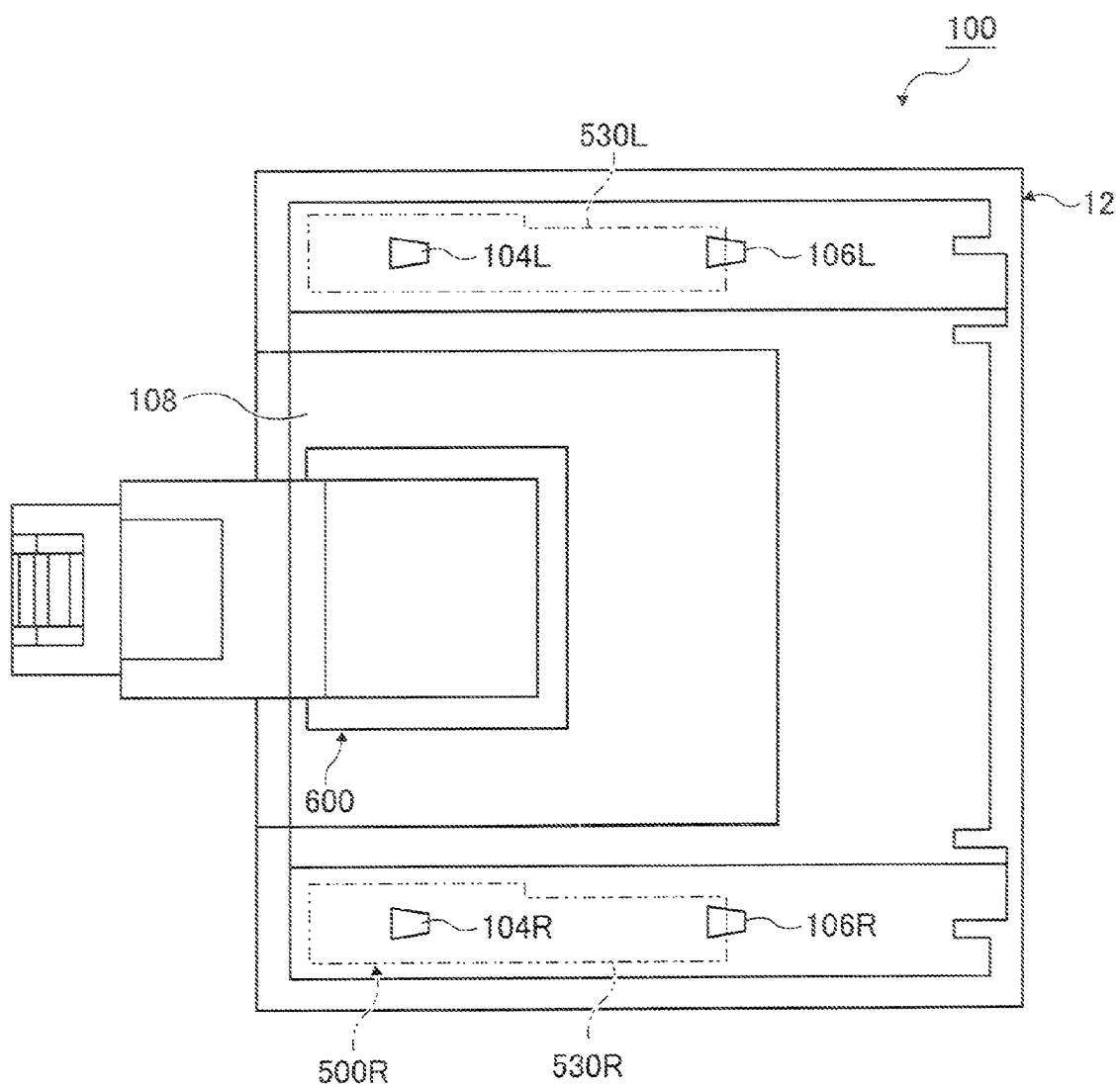
FIG. 4 is a plan view of an image forming apparatus main body of the image forming apparatus in FIG. 1.

FIG. 4 shows the image forming apparatus main body 100. As shown in FIG. 4, attachment holes 104R and 106R for attachment of the buffer device main body 530R of the buffer device 500R to the image forming apparatus main body 100 are formed in the surface 108 on the upper side of the image forming apparatus main body 100. Further, attachment holes 104L and 106L for attachment of the buffer device main body 530L of the buffer device 500L to the image forming apparatus main body 100 are formed in the upward surface of the image forming apparatus main body 100. The attachment holes 104R and 104L are respectively provided on the front side from the attachment holes 106R and 106L.

Figure 5:
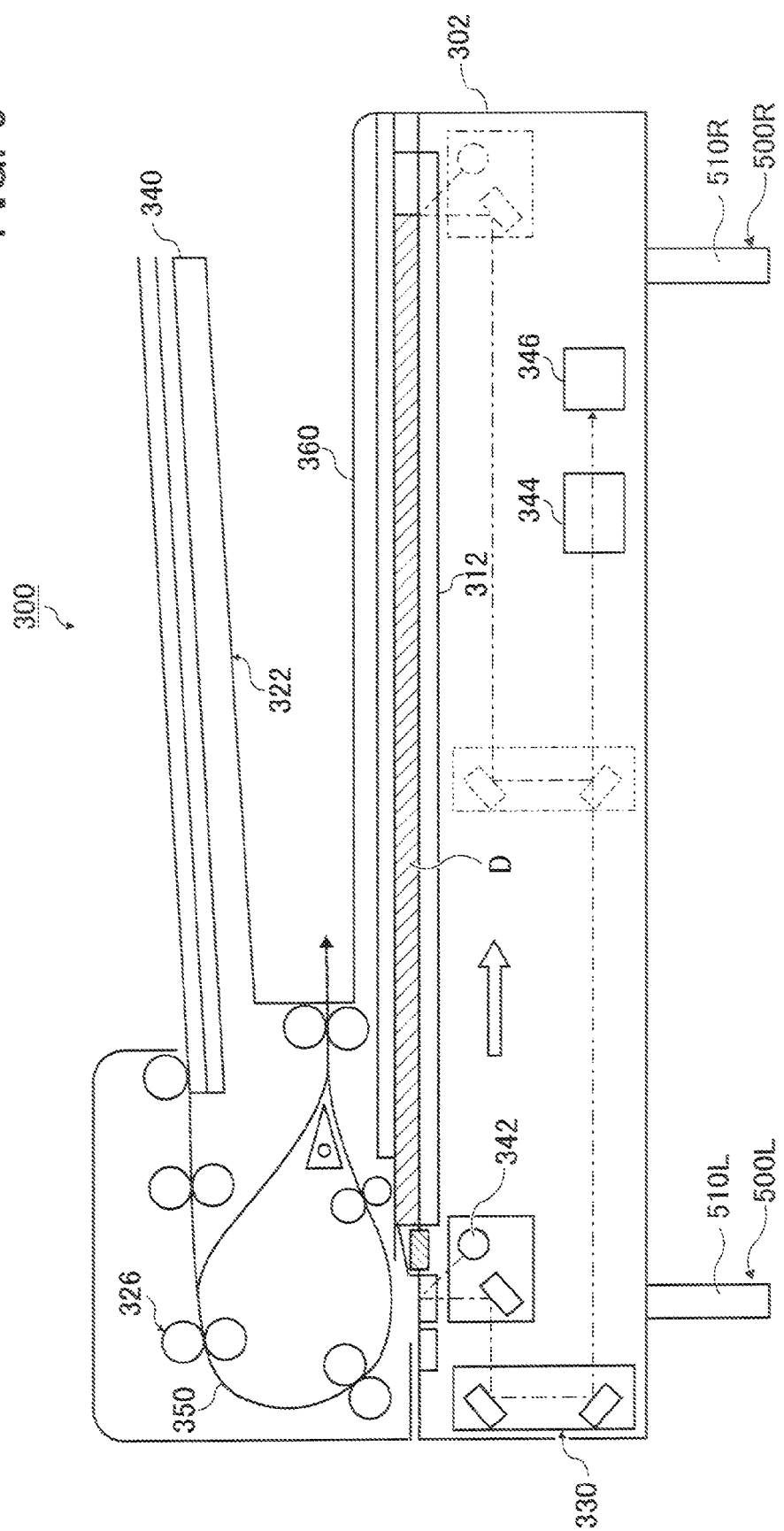
FIG. 5 is a cross-sectional view of a document reading device of the image forming apparatus in FIG. 1 along a plane A-A in FIG. 3.
Figure 6:
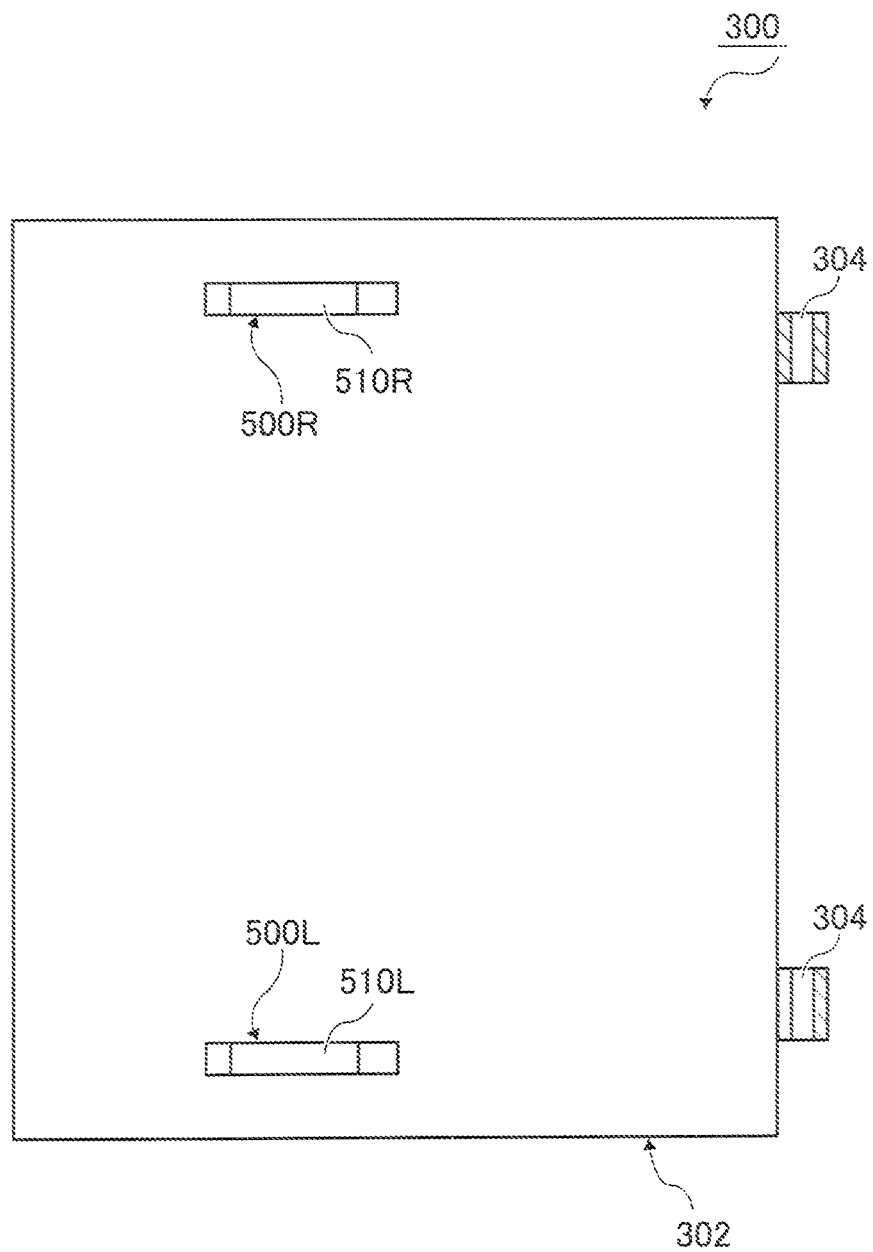
FIG. 6 is a cross-sectional view of the document reading device of the image forming apparatus in FIG. 5 along a plane B-B in FIG. 3.

FIGS. 5 and 6 show the document reading device 300. As described above, the document reading device 300 has the document reading apparatus main body 302. The guide member 510R of the above-described buffer device 500R and the guide member 510L of the above-described buffer device 500L are attached to a downward surface of the document reading apparatus main body 302. Further, the document reading apparatus main body 302 has attached members 304 attached using the above-described hinge 310 (see FIGS. 2 and 3) to the image forming apparatus main body 100.

Further, as shown in FIG. 5, in the document reading device 300 having a platen member 312 of a light transmitting material, the document reading apparatus main body 302 is used as a reading table on which a document is placed. Further, A platen cover 322 openable/closable with respect to the document reading apparatus main body 302 is attached to the document reading apparatus main body 302.

A reader 330 to irradiate the document with light and read the document based on light reflected from the document is attached in the document reading apparatus main body 302. Further, a document conveyance device 326 to automatically convey a document D is attached in the platen cover 322. The document reading device 300 has a function of skimming through the document D being conveyed with document conveyance device 326 and a function of reading the document D placed on the platen member 312.

The document conveyance device 326 has a document table 340 on which the document D before reading is set, a document conveyance passage 350 for conveyance of the document, and a discharge table 360 on which the document after image reading is discharged.

The reader 330 has a light source 342, a lens 344 and a photoelectric conversion element 346. The light source 342 emits light on a document, then reflected light from the document is gathered with the lens 344, then the gathered light is received with the photoelectric conversion element 346 and converted into a signal.

Figure 7:
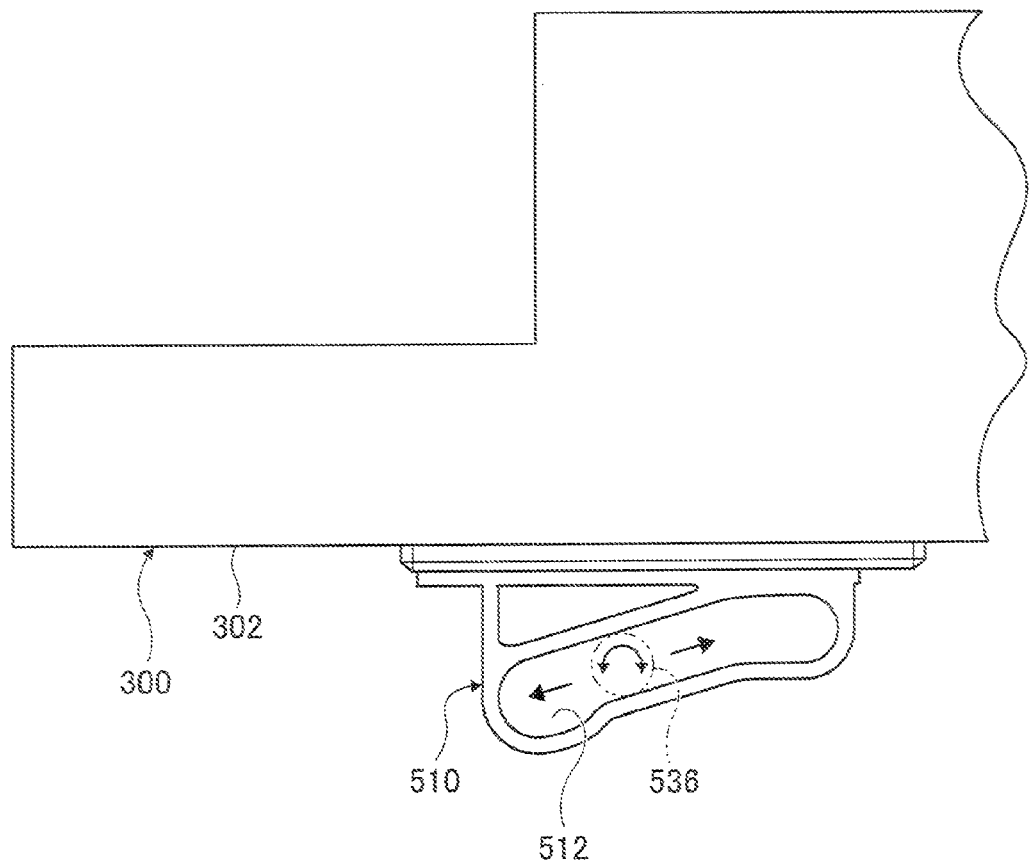
FIG. 7 illustrates a guide member attached to the document reading device in FIG. 5.

FIG. 7 shows the guide member 510. As shown in FIG. 7, the guide member 510 has a guide hole 512. A projection 536 to be described later (see FIGS. 8 and 9) formed on the arm member 534 (see FIGS. 1 and 2) is inserted in the guide hole 512. The guide member 510 supports the arm member 534 such that the projection 536 is rotatable in the guide hole 512 and the projection 536 is movable in the guide hole 512. In this manner, as the projection 536 moves in the guide hole 512, the movement of the arm member 534 is guided with the guide member 510.

Figure 8:
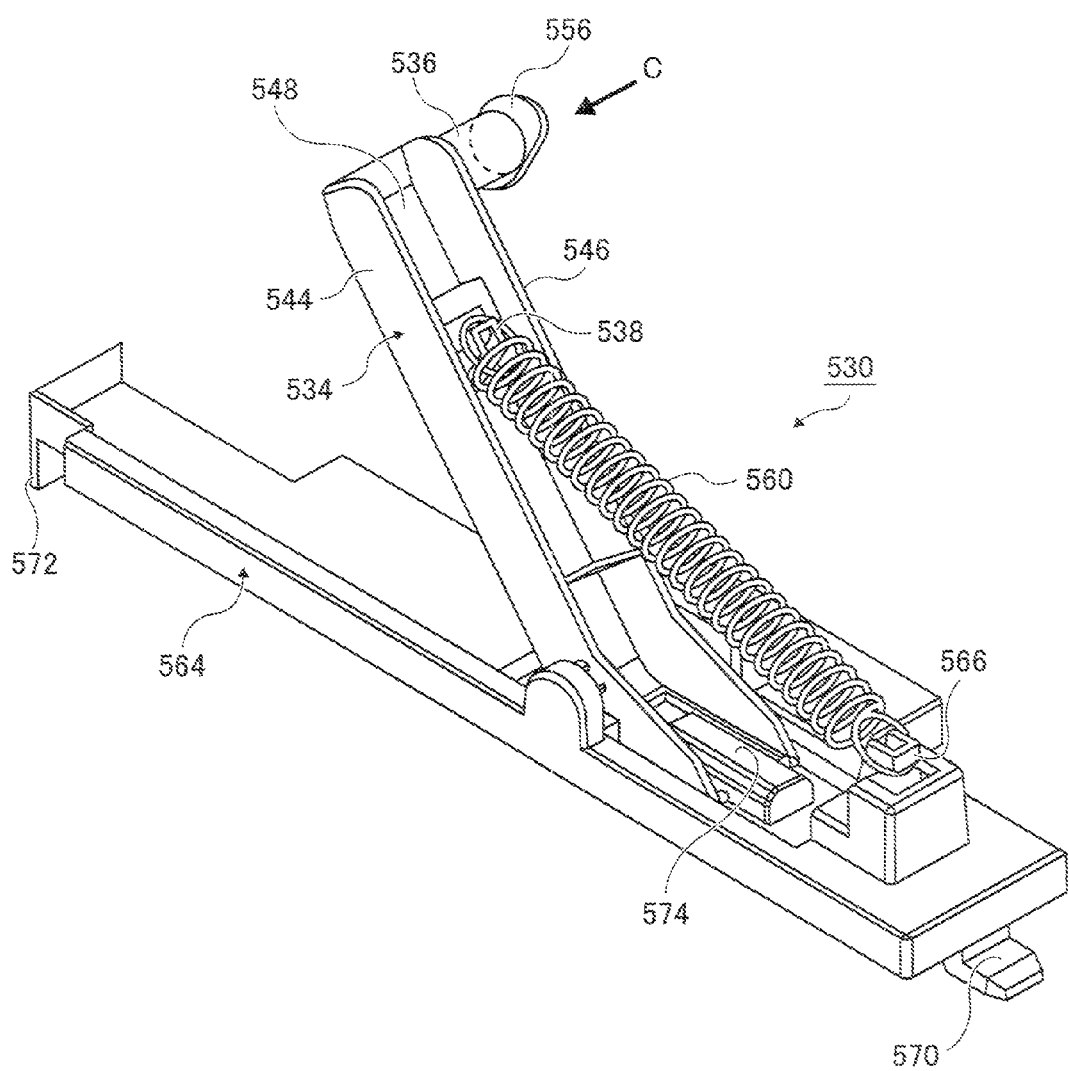
FIG. 8 is a perspective view of a buffer device main body of a buffer device of the image forming apparatus in FIG. 1 when the document reading device is in an opened state from the image forming apparatus main body.
Figure 9:
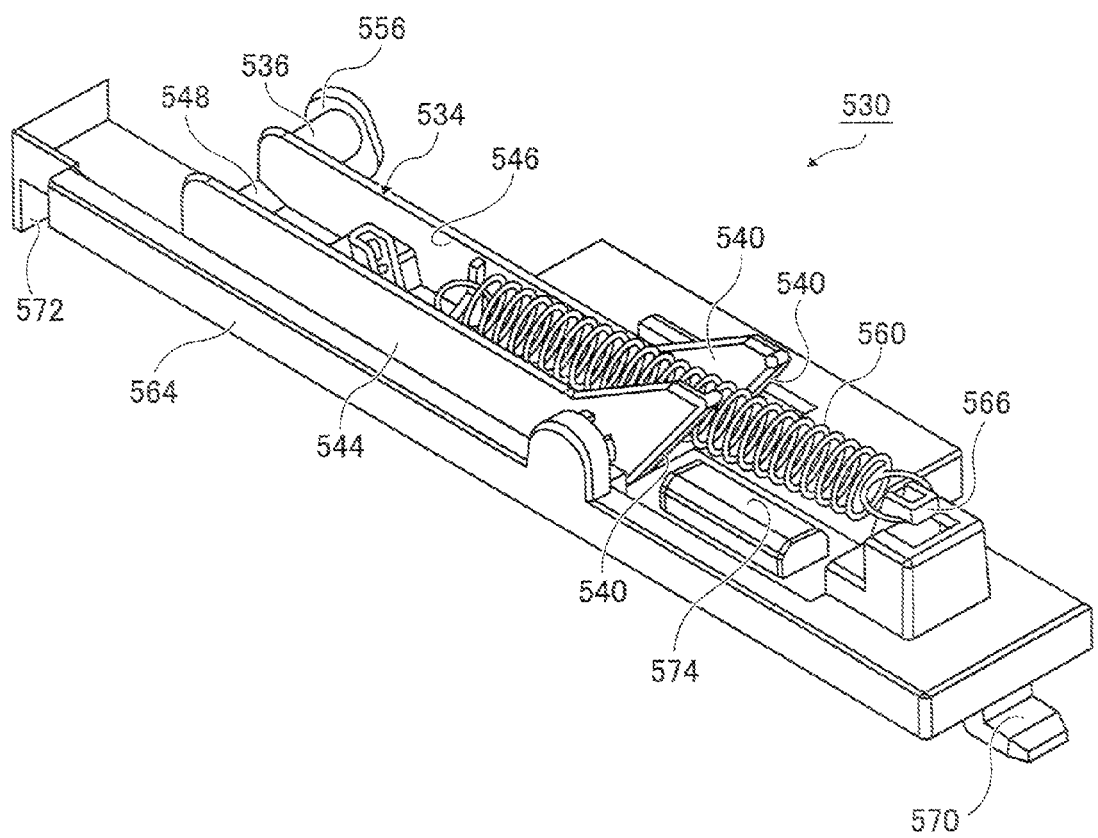
FIG. 9 is a perspective view of the buffer device main body in FIG. 8 when the document reading device is in a closed state with respect to the image forming apparatus main body.
Figure 10:
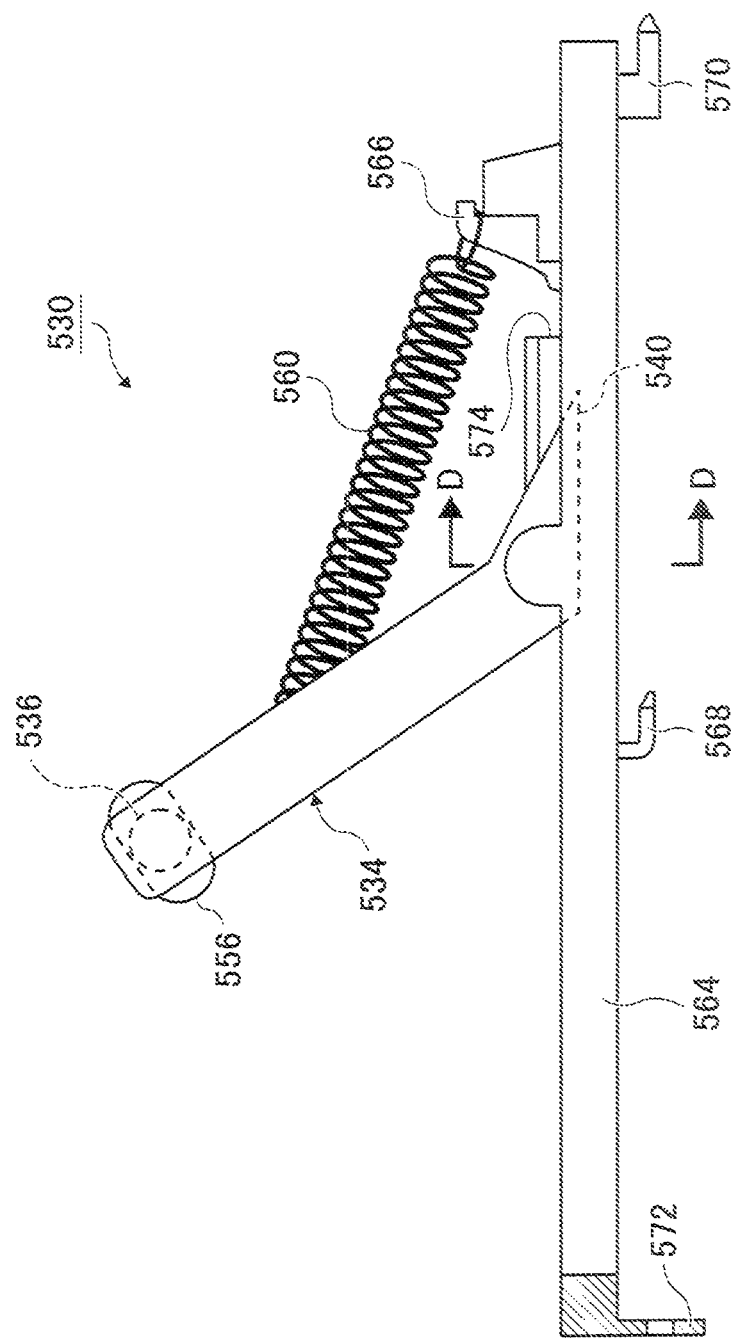
FIG. 10 is a right side view of the buffer device main body in FIG. 8.

FIGS. 8 to 10 show the buffer device main body 530. As described above, the buffer device main body 530 has the arm member 534 and the coil spring 560, and further has a support member 564 to movably support the arm member 534.

The arm member 534 has opposing side plate 544 and side plate 546, and a connecting member 548, approximately vertical to the side plate 544 and the side plate 546, to connect the side plate 544 with the side plate 546. Further, the arm member 534 has the projection 536 inserted into the guide hole 512 of the guide member 510. The projection 536 is projected from the right side toward the left side at one end of the arm member 534. Further, the arm member 534 has a spring attachment member 538 to which one end side of the coil spring 560 is attached.

Further, the arm member 534 has straight members 540 having a linear shape on the other end side. The straight member 540 is formed on the respective side plate 544 and the side plate 546. In the state shown in FIGS. 8 and 10 where the document reading device 300 in an opened state from the image forming apparatus main body 100 is supported, the straight members 540 are pressed with the coil spring 560 against an upward flat surface of the support member 564, thereby the arm member 534 stands still. In this manner, the arm member 534 supports the document reading device 300 in the opened state from the image forming apparatus main body 100 and stands still in a position to support the document reading device 300 in the opened state from the image forming apparatus main body 100.

The support member 564 has a spring attachment member 566 to which the other end of the coil spring 560 is attached. Further, the support member 564 has an insertion projection 568 inserted into the attachment hole 104 (see FIG. 4) in attachment of the buffer device main body 530 to the image forming apparatus main body 100, and an insertion projection 570 inserted into the attachment hole 106 (see FIG. 4) in attachment of the buffer device main body 530 to the image forming apparatus main body 100.

Further, the support member 564 has a screw engagement member 572 screw-engaged with respect to the image forming apparatus main body 100 in attachment of the buffer device main body 530 to the image forming apparatus main body 100. Further, the support member 564 has a suppressing projection 574 used as a distortion suppression member to suppress distortion of the arm member 534 in a direction away from the support member 564. Further, the projection 536 is provided with the protrusion 556. The details of the protrusion 556 will be described later.

Figure 11:
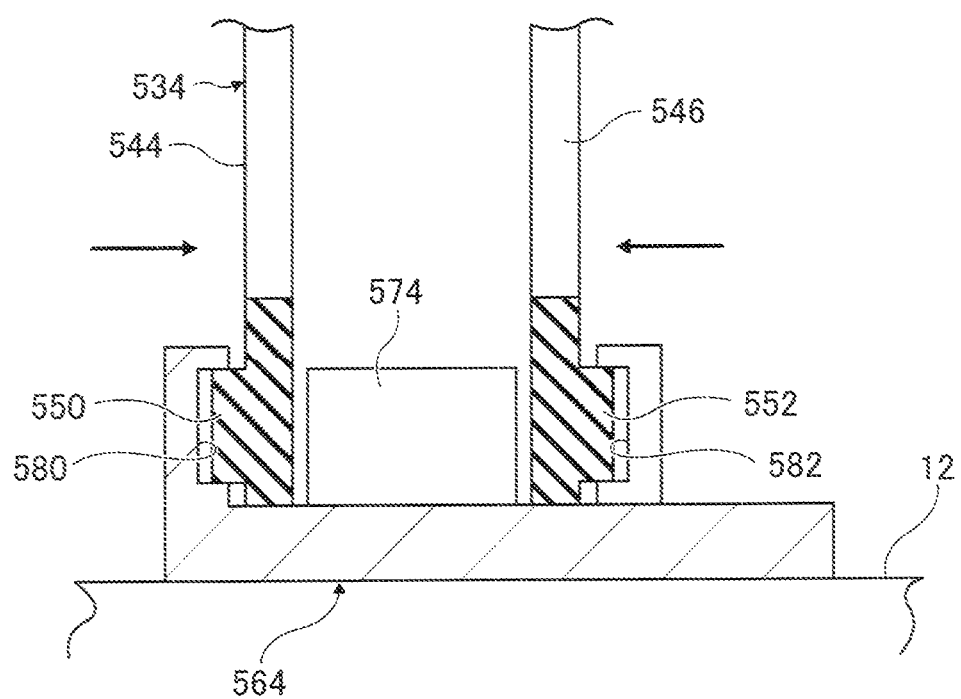
FIG. 11 is a cross-sectional view of the buffer device main body in FIG. 8 along a plane D-D in FIG. 10.

FIG. 11 shows a cross-section of the buffer device main body 530 along a plane D-D in FIG. 10. As shown in FIG. 11, a support concave member 580 and a support concave member 582 are formed in the support member 564. Further, a support convex member 550 is formed on the side plate 544, and a support convex member 552 is formed on the side plate 546. When the support convex member 550 is inserted into the support concave member 580 and the support convex member 552 is inserted into the support concave member 582, the arm member 534 is rotatably supported with the support member 564.

In attachment of the arm member 534 to the support member 564, as shown in an arrow in FIG. 11, the arm member 534 is distorted so as to bring the side plate 544 and the side plate 546 to closer positions, then the support convex member 550 is inserted into the support concave member 580 and the support convex member 552 is inserted into the support convex member 582. At this time, the arm member 534 is attached to the support member 564 in a state where the arm member 534 is positioned as shown in FIG. 9 with respect to the support member 564 to prevent shock absorption between the suppressing projection 574 and the arm member 534.

When the arm member 534 has been attached to the support member 564 and the coil spring 560 has been attached, in the state shown in FIG. 9, the coil spring 560 is provided between the side plate 544 and the side plate 546. Accordingly, the arm member 534 is hardly distorted in the direction away from the support member 564. In this manner, the coil spring 560 suppresses the distortion of the arm member 534 in the direction away from the support member 564.

Further, in the state shown in FIG. 8, as the suppressing projection 574 is provided between the side plate 544 and the side plate 546, the arm member 534 is hardly distorted in the direction away from the support member 564. In this manner, the suppression projection 574 suppresses the distortion of the arm member 534 in the direction away from the support member 564.

Figure 12:
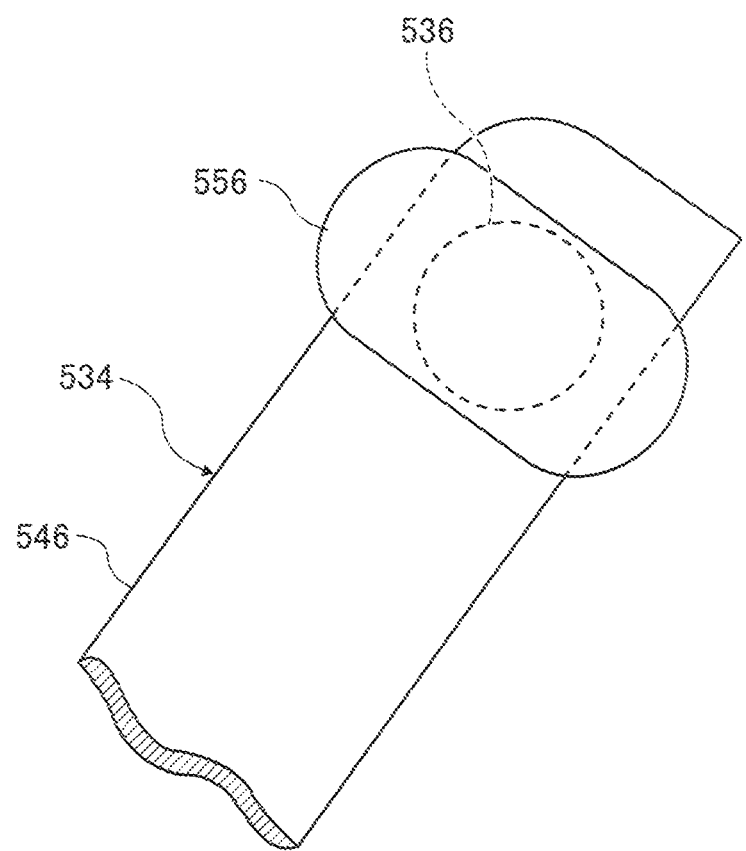
FIG. 12 is an enlarged view of a part of the buffer device main body in FIG. 8 from an arrow C direction in FIG. 8.
Figure 13:
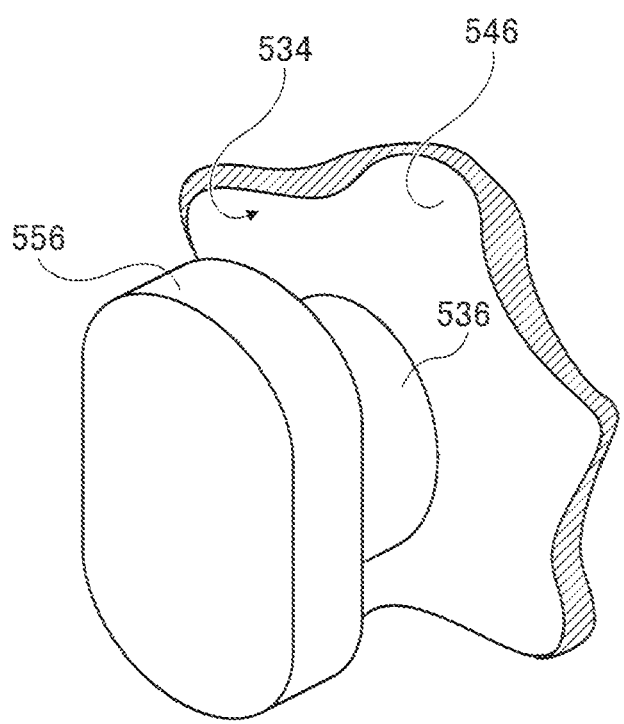
FIG. 13 is an enlarged perspective view of a part of the buffer device main body in FIG. 8.

FIG. 12 shows an enlarged view of a part in the vicinity of the position where the projection 536 of the arm member 534 is formed from an arrow C direction in FIG. 8. FIG. 13 shows an enlarged view of the projection 536. As shown in FIGS. 12 and 13, the projection 536 is formed on the side plate 546, and has an approximately columnar shape. Further, the protrusion 556 which is used as a movement prevention part and which is projected from the projection 536 in a direction approximately parallel to the side plate 546 is provided on the side of the projection 536 opposite to the side plate 546.

Figure 14:
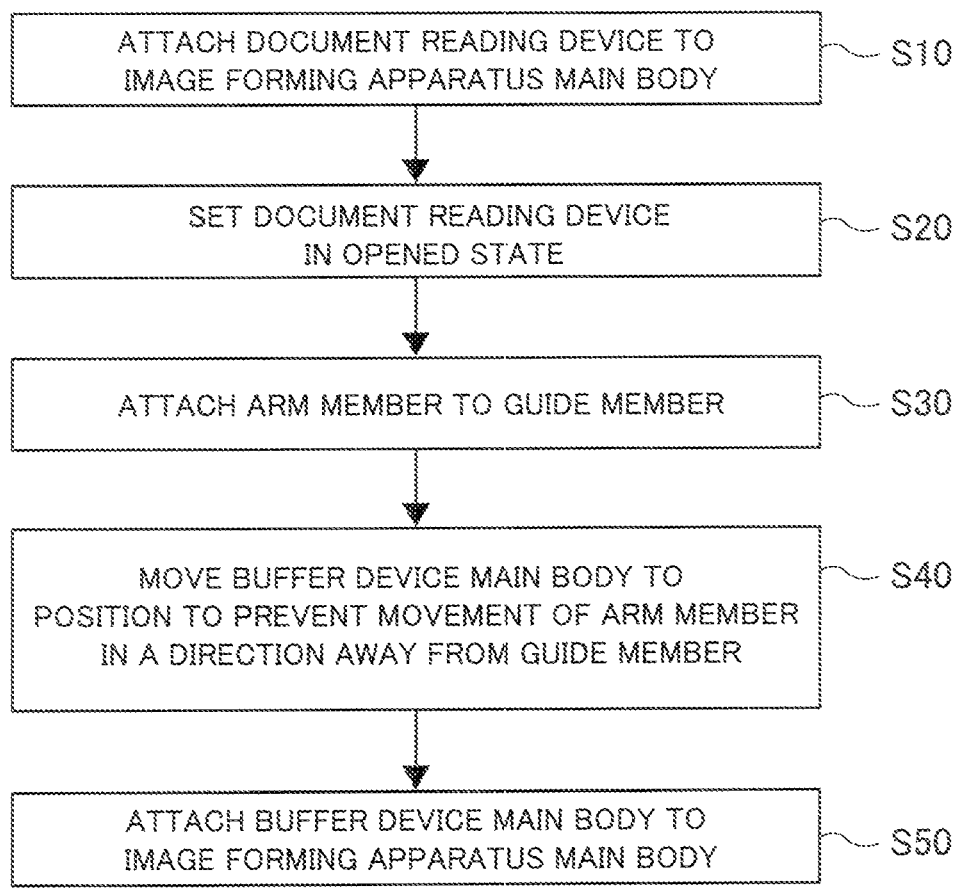
FIG. 14 is a flowchart of an assembly process of the image forming apparatus in FIG. 1.
Figure 15:
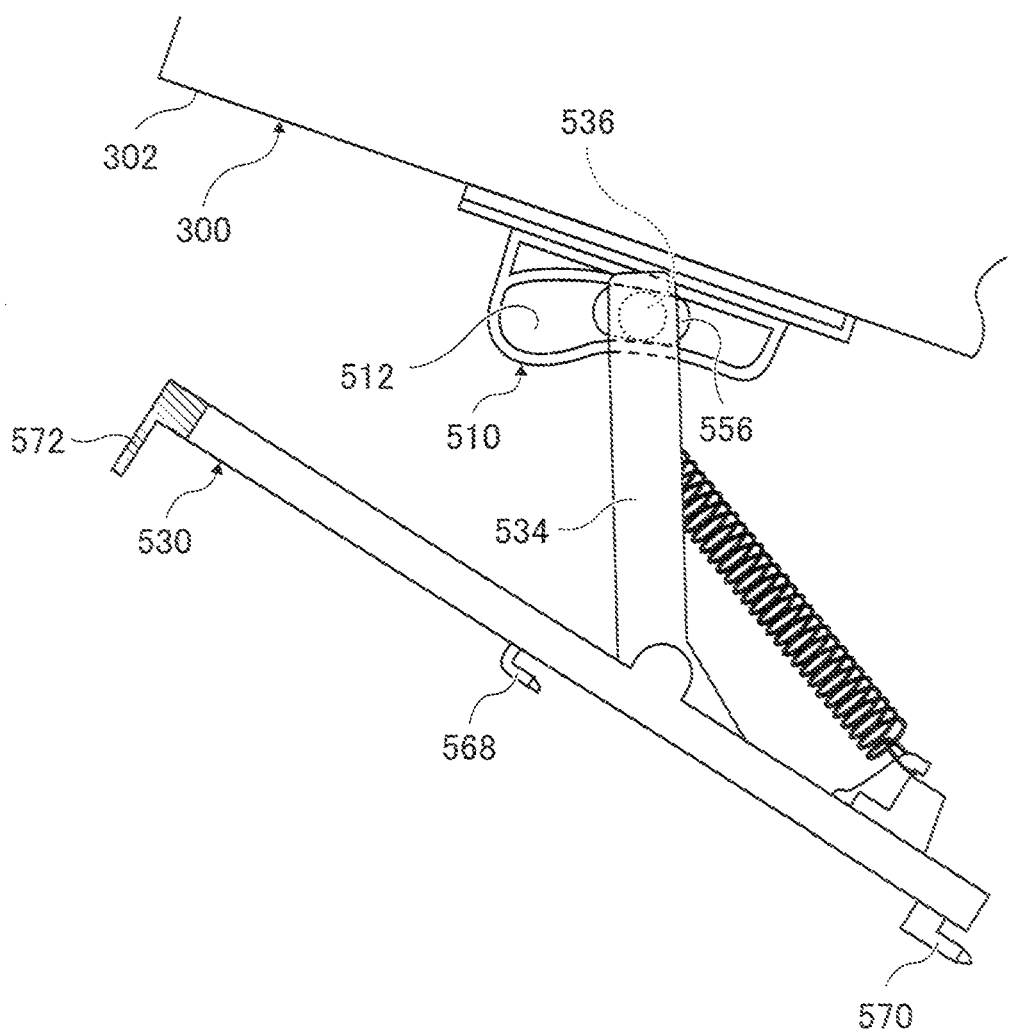
FIG. 15 is a right side view when the buffer device main body is attached to the document reading device.
Figure 16:
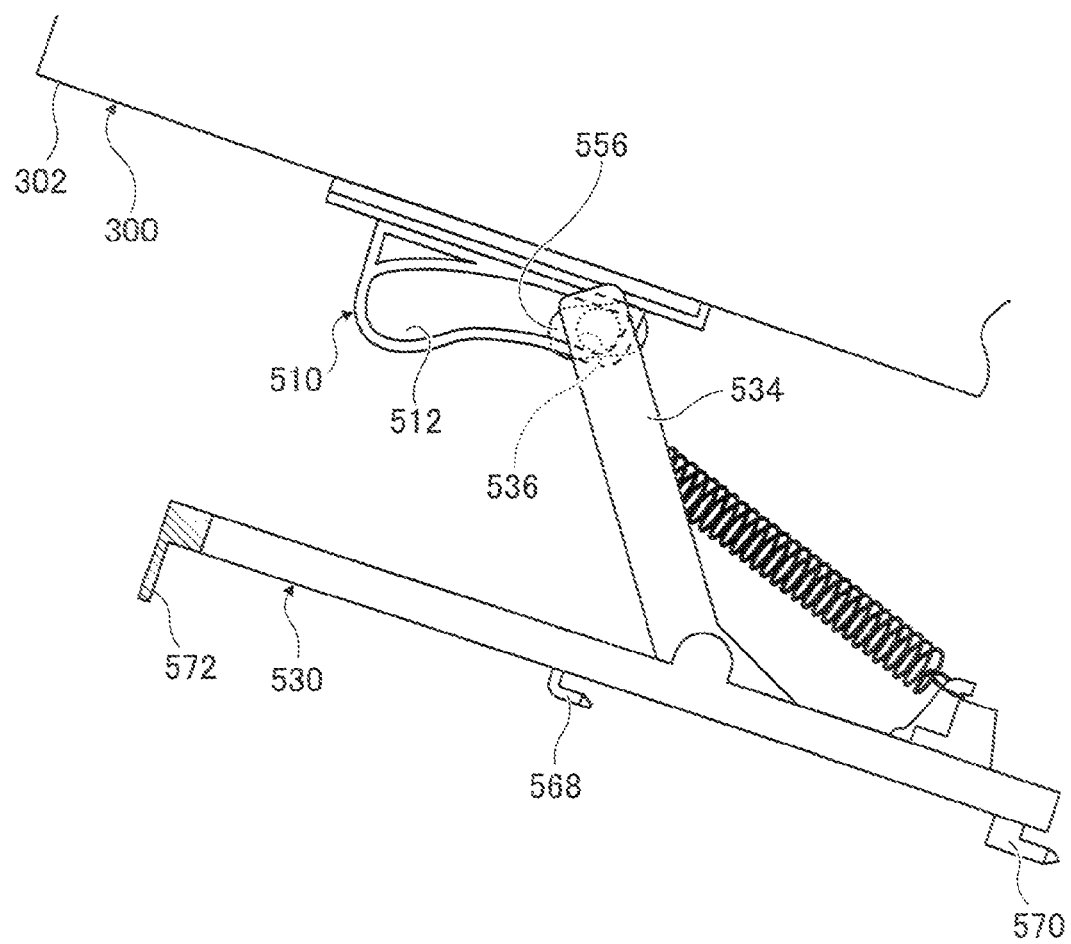
FIG. 16 is a right side view when the buffer device main body is attached to the document reading device so as to prevent movement in a direction away from the document reading device.

FIG. 14 shows a process of assembly of the image forming apparatus 10. Further, FIG. 15 shows a state upon attachment of the buffer device main body 530 to the document reading device 300, and FIG. 16 shows a state where the buffer device main body 530 is attached to the document reading device 300 so as to prevent movement in a direction away from the document reading device 300.

As shown in FIG. 14, at step S10, the document reading device 300 is attached to the image forming apparatus main body 100. At this time, the attached members 304 of the document reading apparatus main body 302 are attached to the image forming apparatus main body 100 via the hinge 310.

At the next step S20, the document reading device 300 is set in the opened state with respect to the image forming apparatus main body 100.

At the next step S30, the arm member 534 is attached to the guide member 510, thereby the buffer device main body 530 is attached to the guide member 510 attached to the document reading apparatus main body 302. More particularly, as shown in FIG. 15, the projection 536 formed on the arm member 534 is inserted into the guide hole 512 formed in the guide member 510 from the right side (front side in FIG. 15) toward the left side (back side in FIG. 15). At this time, the angle of the buffer device main body 530 with respect to the document reading device 300 is adjusted such that the protrusion 556 is provided in a position not to cause shock absorption with respect to the guide member 510 as shown in FIG. 15, then the protrusion 556 and the projection 536 are inserted into the guide hole 512. When the protrusion 556 and the projection 536 are inserted into the guide hole 512, the projection 536 is in contact with the guide member 510, and the protrusion 556 is positioned on the further left side from the guide member 510 (back side in FIG. 15).

At the next step S40, the buffer device main body 530 is moved to a position to prevent the movement of the arm member 534 in the direction away from the guide member 510. More particularly, the buffer device main body 530 is pushed from the state shown in FIG. 15 to the rear side (right side in FIG. 15), and the buffer device main body 530 is moved rearward so as to move the projection 536 while it is guided with the guide hole 512. Then as shown in FIG. 16, the projection 536 is provided at the rear end of the guide hole 512. Further, in this state, when the assembly operator releases his/her hand from the buffer device main body 530, the buffer device main body 530 rotates about the projection 536 from the angle shown in FIG. 15 to the angle shown in FIG. 16 in a counterclockwise direction.

In the state shown in FIG. 16, the protrusion 556 is on the left side from the guide member 510 in a position for shock-absorption with respect to the guide member 510 when the arm member 534 is to be moved to the right side. Accordingly, the movement of the arm member 534 in the direction away from the guide member 510 can be prevented.

At the next step S50, in the state where the movement of the arm member 534 in the direction away from the guide member 510 is prevented and the buffer device main body 530 is attached to the document reading device 300, the buffer device main body 530 is attached to the image forming apparatus main body 100. At this time, the insertion projection 570 is inserted into the attachment hole 106, the insertion projection 568 is inserted into the attachment hole 104, and the screw engagement member 572 is screw-engaged with image forming apparatus main body 100.

As described above, in assembly before attachment of the buffer device main body 530 to the image forming apparatus main body 100, in the state where the document reading device 300 is opened from the image forming apparatus main body 100, when the arm member 534 is attached to the guide member 510, the protrusion 556 is used as a movement prevention part to prevent the arm member 534 from moving in the direction away from the guide member 510.

Figure 17:
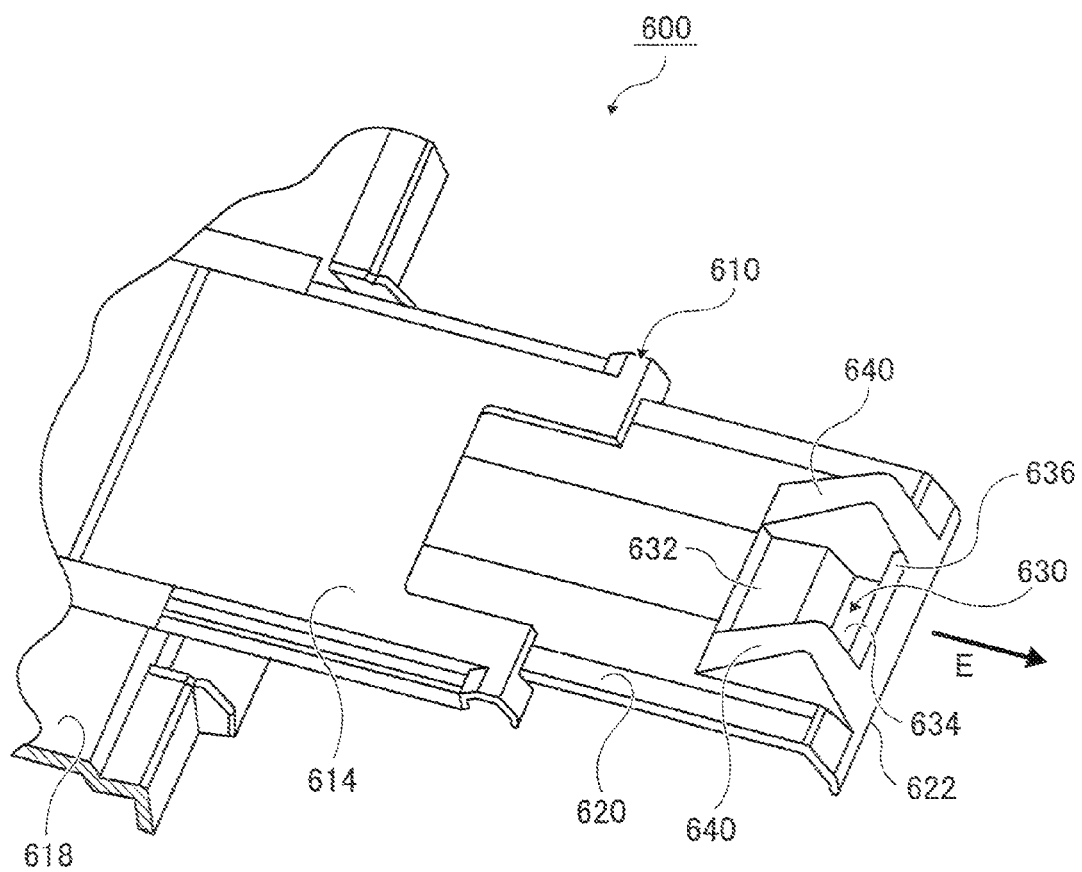
FIG. 17 is a perspective view of a discharge part of the image forming apparatus in FIG. 1.

FIG. 17 shows the discharge part 600. The discharge part 600 has the surface 108 on the upper side of the image forming apparatus main body 100 used as a discharge part main body and an extension part 610 provided on the surface 108 so as to be extendable from the surface 108 in a sheet discharge direction indicated with an arrow E in FIG. 17. The extension part 610 has a first extension member 614 extendable from the surface 108 in the sheet discharge direction and a second extension member 620 extendable from the first extension member 614 in the sheet discharge direction. The extension part 610 supports a part of a sheet, on which an image is formed, protruded from the surface 108, from the lower side in the gravitational direction.

The extension part 610 has a hook 630, fallen to the opposite side to a rear surface (lower surface) of the sheet so as to catch a finger in the direction where the extension part 610 extends in the sheet discharge direction, in the second extension member 620. Further, the extension part 610 has two projections 640 projected to the rear surface side of the sheet. As shown in FIG. 17, the hook 630 is provided between the two projections 640.

The hook 630 has a first concave member 632 fallen to the opposite side to the sheet rear surface, a second concave member 634, provided on the downstream side from the first concave member 632 in the sheet discharge direction, having a depth greater than that of the first concave member 632, and a wall surface 636, provided on the downstream side from the second concave member 634 in the sheet discharge direction, in a direction orthogonal to the sheet discharge direction.

Figure 18A:
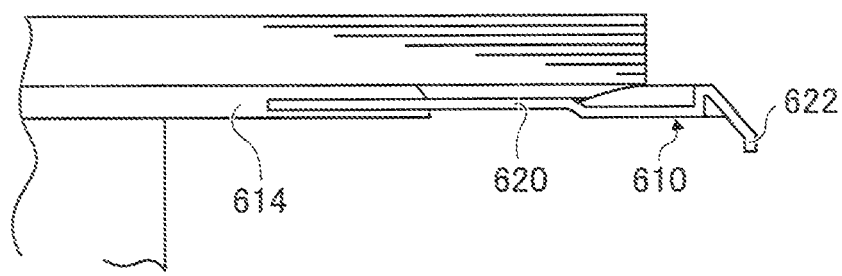
FIG. 18A is a left side view showing the discharge part in FIG. 17 supporting a sheet when the downstream side end of the sheet in a sheet discharge direction is positioned on the upstream side from a downstream side end of an extension part in the sheet discharge direction.
Figure 18B:
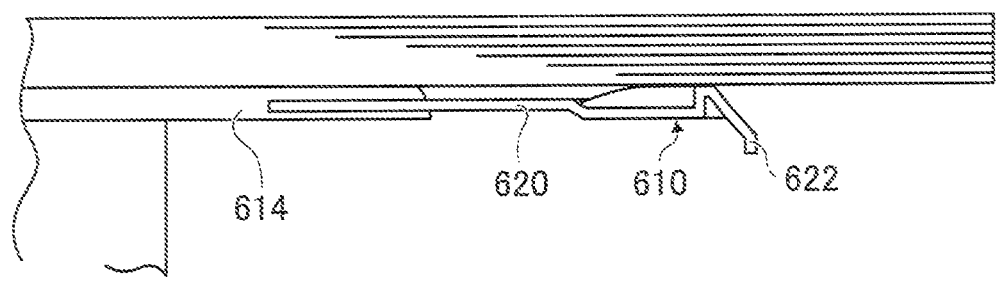
FIG. 18B is a left side view showing the discharge part in FIG. 17 supporting a sheet when the downstream side end of the sheet is positioned on the downstream side from the downstream side end of the extension part in the sheet discharge direction.

FIG. 18A shows a state where the discharge part 600 supports a sheet with its downstream side end in the sheet discharge direction positioned on the upstream side from the downstream side end 622 of the extension part 610 in the sheet discharge direction. FIG. 18B shows a state where the discharge part 600 supports a sheet with its end in the sheet discharge direction positioned on the downstream side from the downstream side end 622 of the extension part 610 in the sheet discharge direction. In this manner, the extension part 610 supports a sheet with its downstream side end in the sheet discharge direction positioned on the upstream side from the downstream side end 622 of the extension part 610 in the sheet discharge direction, or supports a sheet with its end positioned on the downstream side from the end 622 in the sheet discharge direction.

As shown in FIG. 18B, when the discharge part 600 supports a sheet with its downstream side end in the sheet discharge direction positioned on the downstream side from the downstream side end 622 of the extension part 610 in the sheet discharge direction, a part, between the part of the sheet supported with the one projection 640 from the lower direction and the part supported with the other projection 640 from the lower direction, falls into the hook 630, then the sheet becomes distorted, and the distortion causes rigidity in the sheet.

The extension part 610 may be extended when used, and when not used, it can be contracted.

Figure 19:
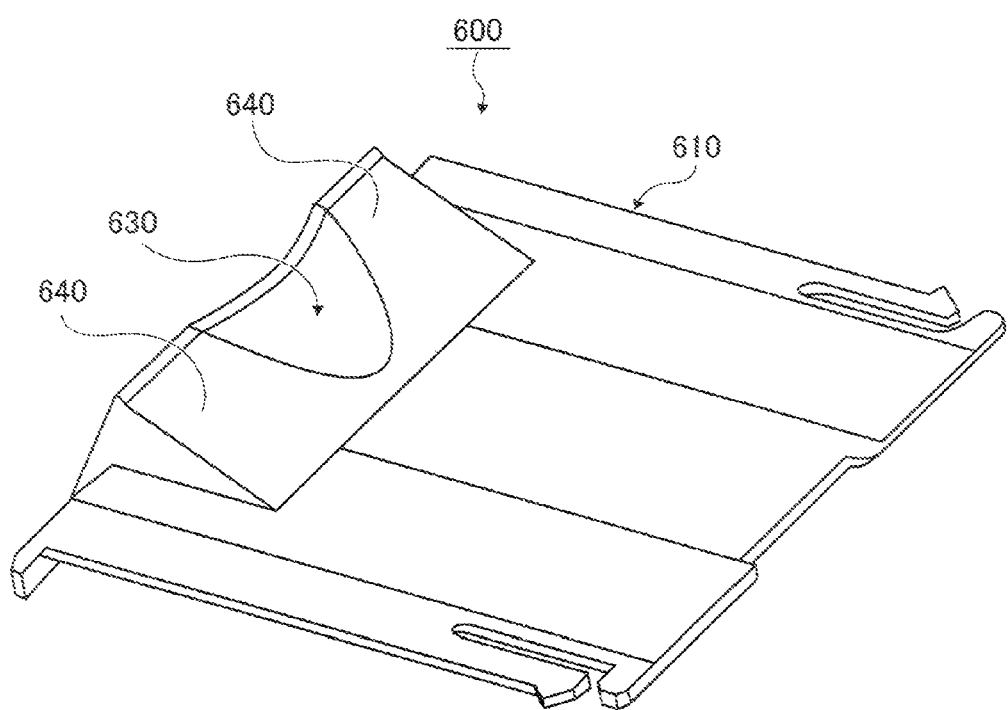
FIG. 19 is a perspective show of a modification of the discharge part of the image forming apparatus in FIG. 1.

FIG. 19 shows a modification of the discharge part 600. In the discharge part 600 of the image forming apparatus 10 according to the above-described exemplary embodiment of the present invention, the hook 630 is formed with a combination of flat surfaces. In this modification, however, the hook 630 is formed with a curved surface. Since the other elements than the hook 630 as described above are the same as those in the discharge part 600 of the image forming apparatus 10 according to the above-described exemplary embodiment of the present invention, the explanations of the other elements will be omitted.

In the above-described exemplary embodiment, the document reading device is used as a supported body rotatably supported with the image forming apparatus main body and as a second structure rotatably supported with a first structure. Further, the present invention is applicable to other devices than the document reading device used as the supported body and the second structure. For example, the present invention is applicable to a case where a post-processing device to perform post processing on a sheet on which an image is formed is used as the supported body and as the second structure.

Figure 20:
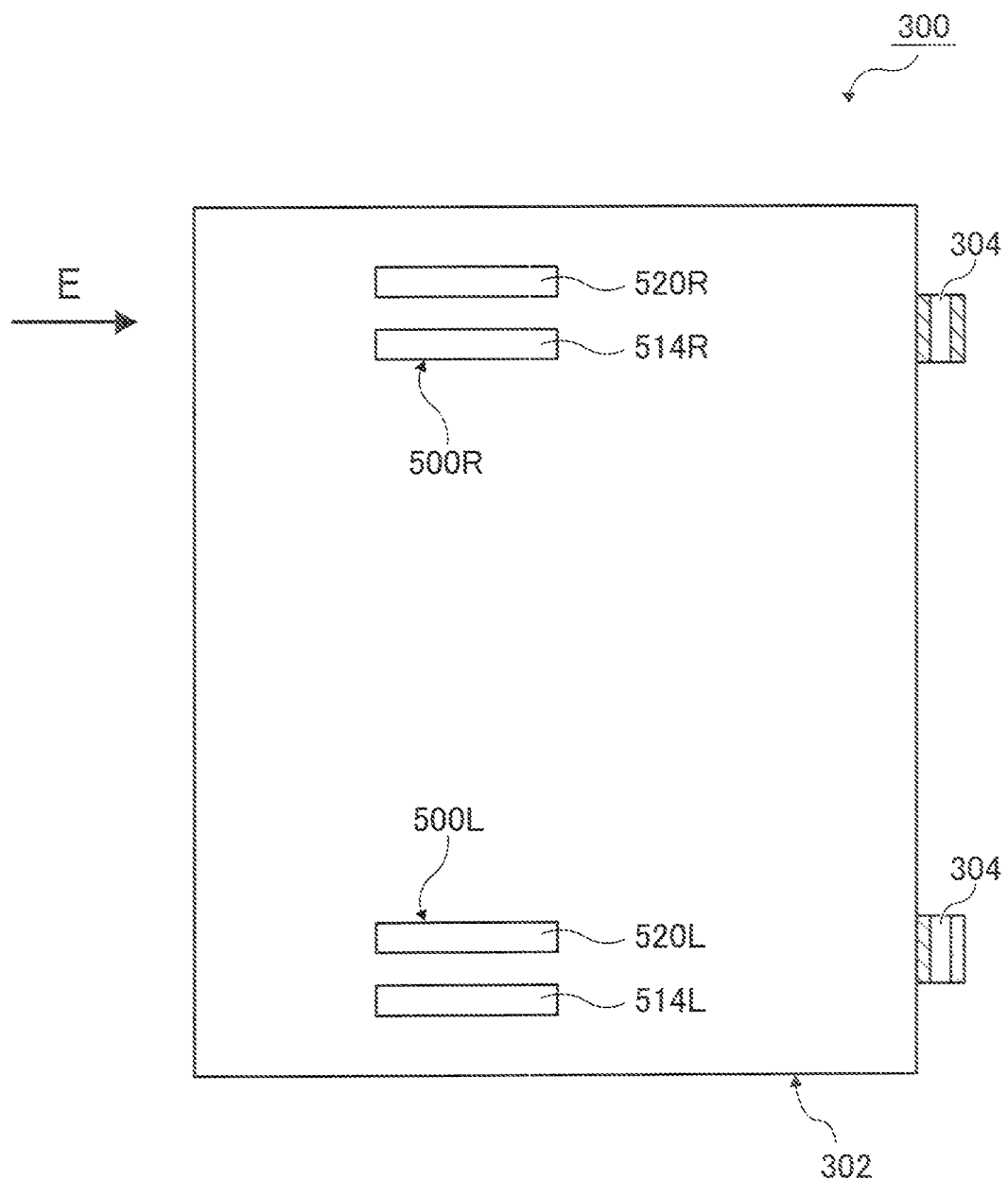
FIG. 20 illustrates a lower side surface of the document reading device of the image forming apparatus according to a second exemplary embodiment of the present invention.

FIG. 20 shows a lower side surface of the document reading device 300 of the image forming apparatus 10 according to a second exemplary embodiment of the present invention. In the image forming apparatus 10 according to the above-described first exemplary embodiment, the guide member 510 is used as a guide, the arm member 534, as a guided member, and the protrusion 556 used as a movement prevention part is provided on the arm member 534. On the other hand, in the image forming apparatus 10 according to the second exemplary embodiment, a movement prevention part is provided on the side of the guide member. That is, in assembly before attachment of the buffer device main body 530 to the image forming apparatus main body 100, in the state where the document reading device 300 is opened from the image forming apparatus main body 100, when the arm member 534 is attached to the guide member, the movement prevention part provided on the guide member prevents movement of the arm member 534 in a direction away from the guide member.

Further, in the image forming apparatus 10 according to the above-described first exemplary embodiment, the guide member 510R of the buffer device 500R and the guide member 510L of the buffer device 500L are attached to the downward surface of the document reading apparatus main body 302 (see FIG. 6). On the other hand, in the image forming apparatus 10 according to the second exemplary embodiment, as shown in FIG. 20, a first guide member 514R and a second guide member 520R of the buffer device 500R, and a first guide member 514L and a second guide member 520L of the buffer device 500L are attached to the downward surface of the document reading apparatus main body 302. That is, in the image forming apparatus 10 according to the above-described first exemplary embodiment, the buffer devices 500R and 500L respectively have one guide member, while, in the image forming apparatus 10 according to the second exemplary embodiment, the buffer devices 500R and 500L respectively have a pair of guide members.

In the second exemplary embodiment, as in the case of the above-described first exemplary embodiment, as the buffer device 500R and the buffer device 500L have the same structure, the buffer device 500R will be described hereinbelow, and the explanation of the buffer device 500L will be omitted. Further, hereinbelow, the buffer device 500R will be referred to as a buffer device 500 unless the buffer device 500R is particularly distinguished from the buffer device 500L.

The first guide member 514 and the second guide member 520 are both plate members approximately parallel to a sheet conveyance direction, and attached, with an approximately constant interval therebetween, approximately parallel to each other, to the downward surface of the document reading apparatus main body 302.

Figure 21:
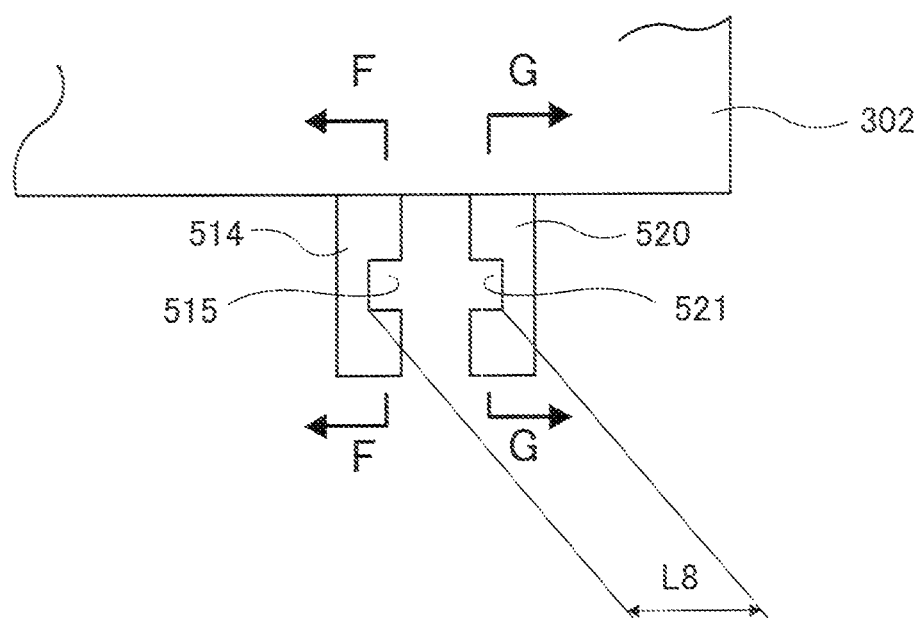
FIG. 21 illustrates a pair of guide members provided on the document reading device in FIG. 20 from an arrow E direction in FIG. 20.

FIG. 21 shows the first guide member 514 and the second guide member 520. A guide groove 515 is formed in a surface of the first guide member 514 facing the second guide member 520. Further, a guide groove 521 is formed in a surface of the second guide member 520 facing the first guide member 514. Note that the distance between an end of the guide groove 515 on the opposite side to the guide groove 521 and an end of the guide groove 521 on the opposite side to the guide groove 515 is L8.

Figure 22A:
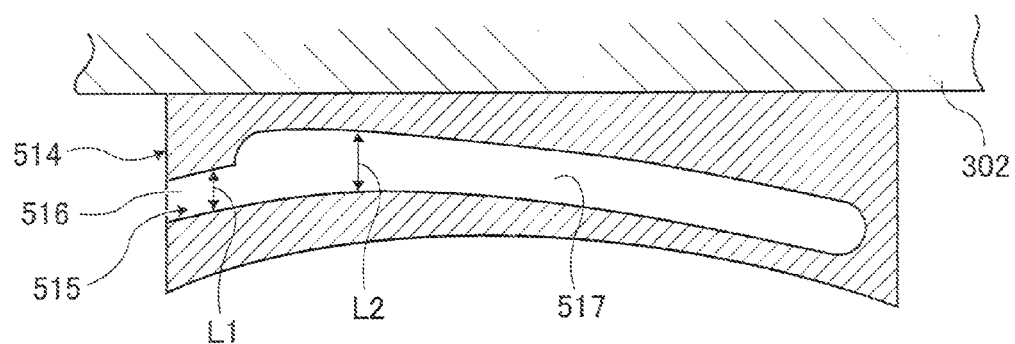
FIG. 22A is a cross-sectional view of one of the pair of guide members in FIG. 21 along a plane F-F in FIG. 21.
Figure 22B:
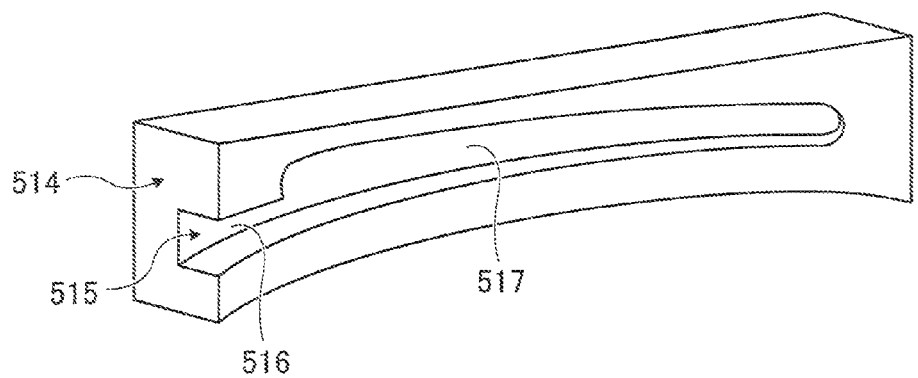
FIG. 22B is a perspective view of the one of the pair of guide members in FIG. 21.

FIG. 22 shows the first guide member 514. In the guide groove 515 formed in the first guide member 514, a front side (left side in FIG. 22A) end reaches a front side end of the first guide member 514, and a rear side (right side in FIG. 22B) end stays on the front side from a rear side end of the first guide member 514. Further, the guide groove 515 has a small width member 516 which is positioned on the front side and which has a comparatively small width, and a large width member 517 which is positioned on the rear side from the small width member 516 and which has a larger width than that of the small width member 516. Note that the width in the guide groove 515 means a length from one end side of the guide groove 515 to the other end side in a direction orthogonal to a lengthwise direction of the guide groove 515. Hereinbelow, the width of the small width member 516 is L1, and the width of the large width member 517 is L2.

Figure 23:
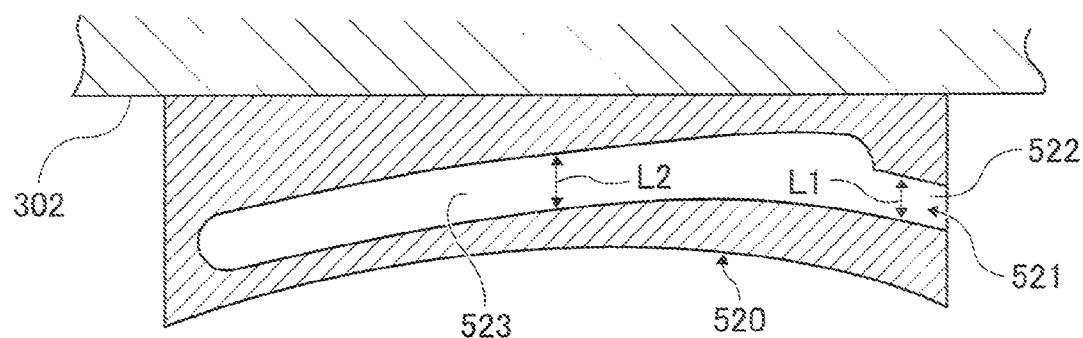
FIG. 23 is a cross-sectional view of the other one of the pair of guide members in FIG. 21 along the plane G-G in FIG. 21.

FIG. 23 shows the second guide member 520. In the guide groove 521 formed in the second guide member 520, a front side (right side in FIG. 23) end reaches a front side end of the second guide member 520, and a rear side (left side in FIG. 23) end stays on the front side from a rear side end of the second guide member 520. Further, the guide groove 521 has a small width member 522 which is positioned on the front side and which has a comparatively small width and a large width member 523 which is positioned on the rear side from the small width member 522 and which has a width larger than that of the small width member 522. Note that the width in the guide groove 521 means a length from one end side of the guide groove 521 to the other end side in a direction orthogonal to a lengthwise direction of the guide groove 521. The width of the small width member 516 of the guide groove 521 is L1 as in the case of the guide groove 515. Further, the width of the large width member 523 of the guide groove 521 is L2 as in the case of the guide groove 515.

Figure 24:
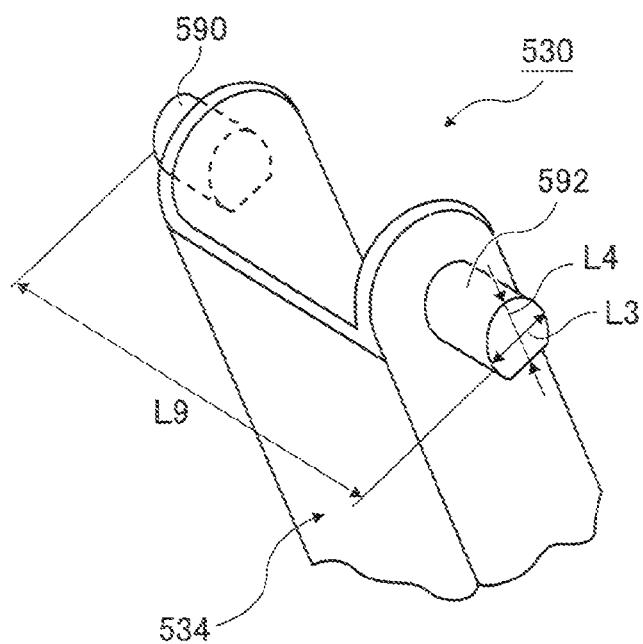
FIG. 24 is an enlarged perspective view of a part of the buffer device main body of the image forming apparatus according to the second exemplary embodiment of the present invention.

FIG. 24 is an enlarged view of a part of the arm member 534 of the buffer device main body 530 in the image forming apparatus 10 according to the second exemplary embodiment. In the image forming apparatus 10 according to the above-described first exemplary embodiment, the projection 536 is formed so as to be projected from the right side toward the left side on the one end side of the arm member 534 (see FIG. 8). On the other hand, in the second exemplary embodiment, a first projection 590 is formed so as to be projected from the right side toward the left side on one end side of the arm member 534, and a second projection 592 is formed so as to be projected from the left side toward the right side on the other one end side of the arm member 534.

The first projection 590 and the second projection 592 both have a shape formed by cutting a part of a column in its lengthwise direction, and have a so-called D-shaped cross section. In the cross section of the first projection 590 and the second projection 592, the diameter of a large diameter part of an uncut circumference is L3. Further, in the cross section of the first projection 590 and the second projection 592, the diameter of a small diameter (a part of the diameter) part of a partially-cutaway circumference is L4. The diameter L3 is the width of the large width member 517 of the guide groove 515, which is slightly smaller than the width L2 as the width of the large width member 523 of the guide groove 521. Further, the diameter L4 is the width of the small width member 516 of the guide groove 515, which is slightly smaller than the width L1 as the width of the small width member 522 of the guide groove 521.

Further, the length between the left side end of the first projection 590 and the right side end of the second projection 592 is L9. The length L9 is slightly shorter than the length L8 (see FIG. 21) as a length between the end of the guide groove 515 opposite to the guide groove 521 and the end of the guide groove 521 opposite to the guide groove 515.

Figure 25:
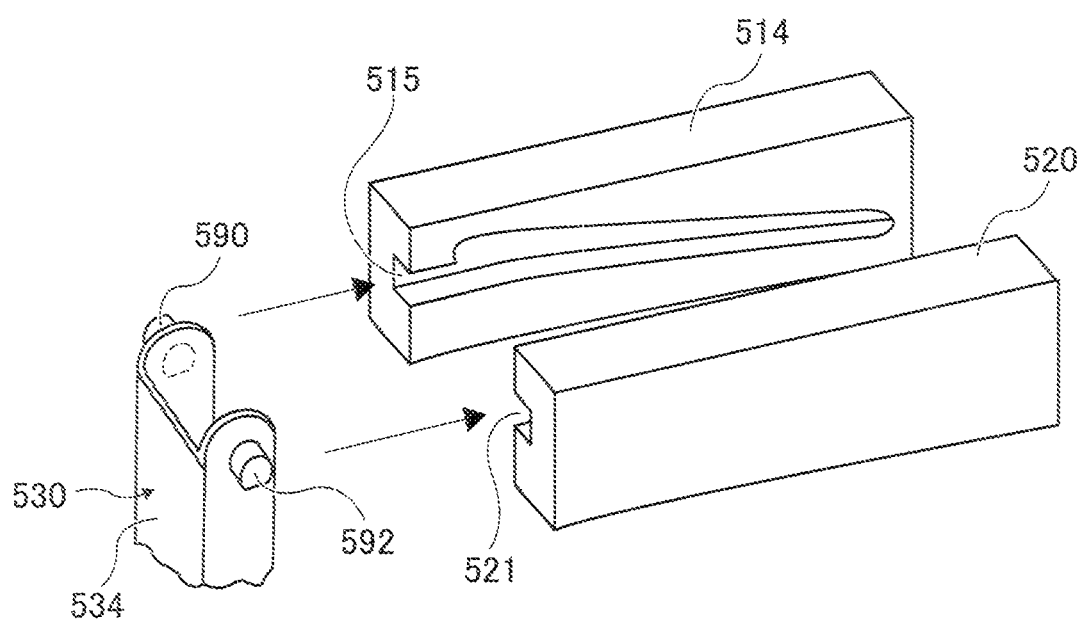
FIG. 25 illustrates a process of attachment of an arm member to the guide member in the image forming apparatus according to the second exemplary embodiment of the present invention.

FIG. 25 shows a process of attachment of the buffer device main body 530 to the first guide member 514 and the second guide member 520 (see S30 in FIG. 14) in the process of assembly of the image forming apparatus 10 according to the second exemplary embodiment by attaching the arm member 534 to the first guide member 514 and the second guide member 520. In this process, as shown in FIG. 25, the first projection 590 is inserted into the guide groove 515, and the second projection 592 is inserted into the guide groove 521.

Figure 26A:
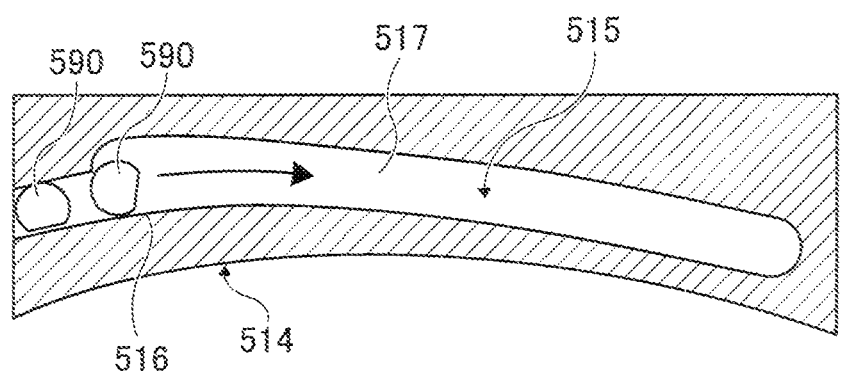
FIG. 26A illustrates the process of attachment of the arm member to the guide member in the image forming apparatus according to the second exemplary embodiment of the present invention when the arm member moves in a guide groove formed in one of the pair of guide members.
Figure 26B:
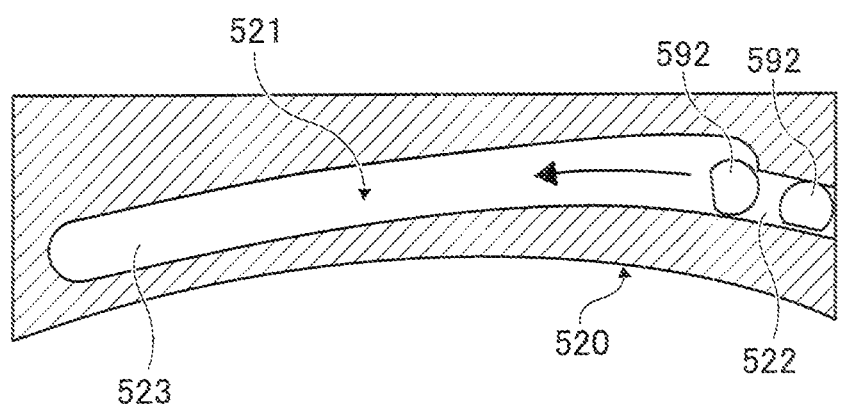
FIG. 26B illustrates the process of attachment of the arm member to the guide member in the image forming apparatus according to the second exemplary embodiment of the present invention when the arm member moves in a guide groove formed in the other one of the pair of guide members.

FIGS. 26A and 26B show the first projection 590 which moves in the guide groove 515 and the second projection 592 which moves in the guide groove 521 in attachment of the arm member 534 to the first guide member 514 and the second guide member 520. In attachment of the arm member 534, the angle of the buffer device main body 530 with respect to the document reading device 300 is adjusted, then as shown in FIGS. 26A and 26B, the first projection 590 passes through the small width member 516 of the guide groove 515 and the second projection 592 passes through the small width member 522 of the guide groove 521.

More particularly, in a state where the directions of the small width member 516 of the guide groove 515 and the small diameter part (diameter L4 part) of the first projection 590 correspond with each other and the directions of the small width member 522 of the guide groove 521 and the small diameter part (diameter L4 part) of the second projection 590 correspond with each other, the buffer device main body 530 is pushed from the front side toward the rear side. At this time, when the directions of the small width member 516 and the small diameter part of the first projection 590 do not correspond or the directions of the small width member 522 and the small diameter part of the second projection 592 do not correspond, the arm member 534 cannot be attached to the first guide member 514 and the second guide member 520. The reason is that the diameter L3 of the large diameter part of the first projection 590 is longer than the with L1 as the width of the small width member 516 of the guide groove 515, and the diameter L3 of the large diameter part of the second projection 592 is longer than the width L1 as the width of the small width member 522 of the guide groove 521.

When the arm member 534 is attached to the first guide member 514 and the second guide member 520, the buffer device main body 530 is pushed rearward to the position where the first projection 590 passes through the small width member 516 and the second projection 592 passes through the small width member 522, then moved rearward. Then after the rearward movement, the buffer device main body 530 is moved to a position to prevent movement of the arm member 534 in a direction away from the first guide member 514 and the second guide member 520. More particularly, the buffer device main body 530 is further moved rearward, and by e.g. the operator's releasing his/her hand from the buffer device main body 530, the buffer device main body 530 is rotated about the first projection 590 and the second projection 592 as shown in FIGS. 26A and 26B.

In the state after the rotation of the buffer device main body 530, the diameter L3 of the large diameter part of the first projection 590 is larger than the width L1 of the small width member 516 of the guide groove 515, the diameter L3 of the large diameter part of the second projection 592 is larger than the width L1 of the small width member 522 of the guide groove 521. Accordingly, when the buffer device main body 530 is to be pulled frontward, the first projection 590 causes shock-absorption with respect to the first guide member 514, and the second projection 592 causes shock-absorption with respect to the second guide member 520. Accordingly, the movement of the arm member 534 in the frontward direction as a direction away from the guide member 510 is prevented.

Further, as the length L9 (see FIG. 24) between the left side end of the first projection 590 and the right side end of the second projection 592 in the arm member 534 is slightly shorter than the length L8 (see FIG. 21) between the end of the guide groove 515 opposite to the guide groove 521 and the end of the guide groove 521 opposite to the guide groove 515, these lengths are approximately the same. Accordingly, the arm member 534 hardly moves leftward/rightward, the first projection 590 hardly drops from the guide groove 515, and the second projection 592 hardly drops from the guide groove 521.

As described above, the present invention is applicable to an image forming apparatus such as a copier, a facsimile apparatus or a printer and an opening/closing device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
an image forming apparatus main body;
a supported body rotatably supported with the image forming apparatus main body; and
a buffer device that shock-absorbs a shock due to a rotational operation of the supported body, the buffer device having:
a guide member provided in the supported body; and
a buffer device main body having a guided member provided in the image forming apparatus main body and guided with the guide member and a pressing member that presses the guided member, and in assembly before attachment of the buffer device main body to the image forming apparatus main body, in a state where the supported body is opened from the image forming apparatus main body, when the guided member is attached to the guide member, a movement prevention part provided in the guided member or the guide member preventing movement of the guided member in a direction away from the guide member,
wherein the buffer device main body also comprises a support member that movably supports the guided member and the support member comprises a distortion suppression member,
wherein the distortion suppression member suppresses distortion of the guided member in a direction away from the support member in a state where the supported body is opened from the image forming apparatus main body, and wherein the distortion suppression member does not suppress distortion of the guided member in a direction away from the support member in a state where the supported body is closed against the image forming apparatus main body.

2. The image forming apparatus according to claim 1, wherein the buffer device main body further has a support member that movably supports the guided member, and the pressing member suppresses distortion of the guided member in a direction away from the support member.

3. The image forming apparatus according to claim 1, wherein the guided member supports the supported body in an opened state from the image forming apparatus main body, and stands still in a position to support the supported body in the opened state from the image forming apparatus main body.

4. An opening/closing device comprising:

a first structure;

a second structure rotatably supported with the first structure; and a buffer device that shock-absorbs a shock due to a rotational operation of the second structure, the buffer device having:

a guide member provided in the second structure; and a buffer device main body having a guided member provided in the first structure and guided with the guide member and a pressing member that presses the guided member, and in assembly before attachment of the buffer device main body to the first structure, in a state where the second structure is opened from the first structure, when the guided member is attached to the guide member, a movement prevention part provided in the guided member or the guide member preventing movement of the guided member in a direction away from the guide member, wherein the buffer device main body also comprises a support member that movably supports the guided member and the support member comprises a distortion suppression member, wherein the distortion suppression member suppresses distortion of the guided member in a direction away from the support member in a state where the second structure is opened from the first structure, and wherein the distortion suppression member does not suppress distortion of the guided member in a direction away from the support member in a state where the second structure is closed against the first structure.

* * * * *